United States Patent
Lee

(10) Patent No.: US 10,696,296 B2
(45) Date of Patent: Jun. 30, 2020

(54) VEHICLE CONTROL APPARATUS AND METHOD FOR CONTROLLING VEHICLE

(71) Applicant: MANDO CORPORATION, Pyeongtaek-si, Gyeonggi-do (KR)

(72) Inventor: Shin-Ae Lee, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 150 days.

(21) Appl. No.: 15/730,408

(22) Filed: Oct. 11, 2017

(65) Prior Publication Data

US 2018/0099664 A1    Apr. 12, 2018

(30) Foreign Application Priority Data

Oct. 11, 2016 (KR) ........................ 10-2016-0131485

(51) Int. Cl.
*B60W 30/09* (2012.01)
*B60W 10/184* (2012.01)

(52) U.S. Cl.
CPC .......... *B60W 30/09* (2013.01); *B60W 10/184* (2013.01); *B60W 2520/14* (2013.01); *B60W 2540/18* (2013.01); *B60W 2552/40* (2020.02); *B60W 2710/182* (2013.01)

(58) Field of Classification Search
CPC ............................. B60W 30/09; B60W 10/184
See application file for complete search history.

(56) References Cited

U.S. PATENT DOCUMENTS

| | | | | |
|---|---|---|---|---|
| 2003/0220730 A1* | 11/2003 | Fujioka | .................. | B62D 6/005 701/70 |
| 2012/0173111 A1* | 7/2012 | Nagaya | .................. | B60K 28/16 701/72 |
| 2017/0297579 A1* | 10/2017 | Natori | ................. | B60W 30/192 |
| 2018/0319380 A1* | 11/2018 | Laine | ........................ | B60T 7/22 |

FOREIGN PATENT DOCUMENTS

| KR | 97-0007217 B1 | 5/1997 |
|---|---|---|
| KR | 2007-0095348 A | 9/2007 |

* cited by examiner

*Primary Examiner* — Jess Whittington
(74) *Attorney, Agent, or Firm* — Morgan, Lewis & Bockius LLP

(57) ABSTRACT

Disclosed herein are a vehicle control apparatus and a method for controlling a vehicle using the same. The vehicle control apparatus according to an embodiment of the present invention includes an input unit that receives handle operation information detected by a sensing device, receives avoidance steering information of a driver, and receives behavior information of a vehicle, a determination unit that determines whether the vehicle is in an emergency steering avoidance state based on the received handle operation information, the received avoidance steering information of the driver, and the received behavior information of the vehicle, and a control unit that controls an evasive handling control (EHC) system and an electronic stability control (ESC) system such that the EHC system presses wheels in advance ahead of the ESC system to perform a braking operation according to a target wheel pressure value, when the vehicle is in the emergency steering avoidance state.

15 Claims, 6 Drawing Sheets

VEHICLE CONTROL APPARATUS AND METHOD FOR CONTROLLING VEHICLE

CROSS-REFERENCE TO RELATED APPLICATION

This application claims the benefit of Korean Patent Application No. 2016-0131485, filed on Oct. 11, 2016 in the Korean Intellectual Property Office, the disclosure of which is incorporated herein by reference.

BACKGROUND

1. Field

Embodiments of the present disclosure relate to a vehicle control apparatus and a method for controlling a vehicle using the same.

2. Description of the Related Art

In general, a conventional electronic stability control (ESC) device controls the posture of a vehicle to prevent driving instability of the vehicle.

At this time, a conventional ESC system determines whether to enter the control by judging the movement of the vehicle using steering information of a driver and behavior information of the vehicle.

However, the conventional ESC system has a limitation in efficiently controlling the posture of the vehicle in an emergency steering avoidance state.

In this regard, the conventional ESC system has a limitation in improving acceleration performance and braking performance while considering the stability at the time of traveling of a vehicle.

Accordingly, in recent years, research has been continuously conducted on an improved vehicle control apparatus and a method for controlling a vehicle using the same, which may improve the acceleration performance and the braking performance while considering the stability at the time of traveling of the corresponding vehicle, in an emergency steering avoidance state.

In addition, in recent years, research has been continuously conducted on an improved vehicle control apparatus and a method for controlling a vehicle using the same, which may allow a driver to recognize a current braking state according to a current wheel pressure to thereby restrain the driver's anxiety about the current braking state according to the current wheel pressure while inducing the driver to perform a careful driving.

SUMMARY

Therefore, it is an aspect of the present disclosure to provide a vehicle control apparatus and a method for controlling a vehicle using the same, which may improve acceleration performance and braking performance while considering stability at the time of driving of the vehicle.

It is another aspect of the present disclosure to provide a vehicle control apparatus and a method for controlling a vehicle using the same, which may restrain anxiety of a driver about a current braking state according to a current wheel pressure while inducing the driver to perform a careful driving.

Additional aspects of the disclosure will be set forth in part in the description which follows and, in part, will be obvious from the description, or may be learned by practice of the disclosure.

In accordance with one aspect of the present disclosure, a vehicle control apparatus includes: an input unit that receives handle operation information detected by a sensing device, receives avoidance steering information of a driver, and receives behavior information of a vehicle; a determination unit that determines whether the vehicle is in an emergency steering avoidance state based on the received handle operation information, the received avoidance steering information of the driver, and the received behavior information of the vehicle; and a control unit that controls an evasive handling control (EHC) system and an electronic stability control (ESC) system such that the EHC system applies pressure to wheels in advance ahead of the ESC system to perform a braking operation according to a target wheel pressure value, when the vehicle is in the emergency steering avoidance state.

Here, the control unit may control the EHC system to apply pressure to the wheel located on an outer side among the wheels in advance to perform the braking operation according to the target wheel pressure value.

Also, the control unit may control the EHC system to apply pressure to the rear wheels of the wheels in advance, and to apply pressure to the front wheels thereof in advance to perform the braking operation according to the target wheel pressure value when the pressure is applied to the rear wheels.

Here, the control unit may control the EHC system to press the wheel located on an outer side among the wheels in advance to perform the braking operation according to the target wheel pressure value.

Also, the control unit may control the EHC system to press the rear wheels of the wheels in advance, and to press the front wheels thereof in advance to perform the braking operation according to the target wheel pressure value when the rear wheels are pressed.

Also, when determining whether the vehicle is in the emergency steering avoidance state, the determination unit may determine whether a steering angle change rate value of the received avoidance steering information of the driver is equal to or larger than a predetermined value, and whether the vehicle is in a sudden handle operation state in which the handle operation information is outside target handle operation information after exceeding a peaked point of the steering angle change rate value.

Also, when determining whether the vehicle is in the emergency steering avoidance state, the determination unit may determine whether a road surface on which the vehicle is currently driving is a high-friction road surface using a lateral acceleration value of the received behavior information of the vehicle, whether a yaw rate change rate value of the received behavior information of the vehicle is equal to or larger than a predetermined value when the road surface on which the vehicle is currently driving is the high-friction road surface, and whether the vehicle is in a state in which the yaw rate change rate value is outside a target yaw rate change rate value after exceeding a peaked point of the yaw rate change rate value.

Also, the vehicle control apparatus may further include an identification unit that identifies that the EHC system presses the wheels in advance to perform the braking operation according to the target wheel pressure value, when the vehicle is in the emergency steering avoidance state.

Also, the vehicle control apparatus may further include an identification unit that identifies that the braking operation is completely performed according to the target wheel pressure value, when the EHC system completely performs the braking operation according to the target wheel pressure value.

In accordance with another aspect of the present disclosure, a method for controlling a vehicle includes: receiving handle operation information detected by a sensing device, receiving avoidance steering information of a driver, and receiving behavior information of a vehicle; determining whether the vehicle is in an emergency steering avoidance state based on the received handle operation information, the received avoidance steering information of the driver, and the received behavior information of the vehicle; and controlling an EHC system and an ESC system such that the EHC system applies pressure to wheels in advance ahead of the ESC system to perform a braking operation according to a target wheel pressure value, when the vehicle is in the emergency steering avoidance state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
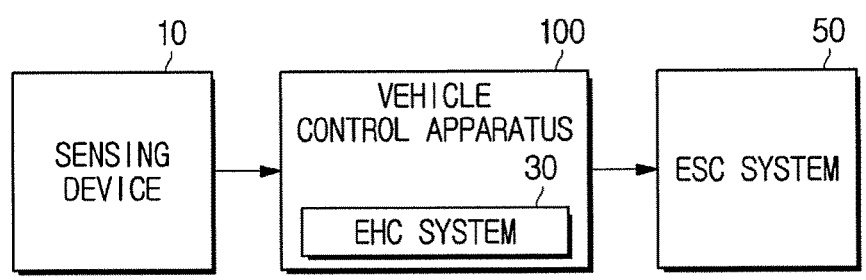
FIG. 1 is a block diagram illustrating a state in which a vehicle control apparatus according to a first embodiment of the present invention is connected to a sensing device, an evasive handling control (EHC) system, and an electronic stability control (ESC) system.

Hereinafter, embodiments of the present invention will be described with reference to the accompanying drawings. The following examples are provided to convey the spirit of the disclosure to those skilled in the art. The present disclosure is not limited to the embodiments disclosed herein and may be embodied in other forms. In the drawings, some of the portion irrelevant to the description will be omitted and not shown in order to clearly describe the present, and disclosed components may be slightly exaggerated to facilitate understanding.

Figure 2:
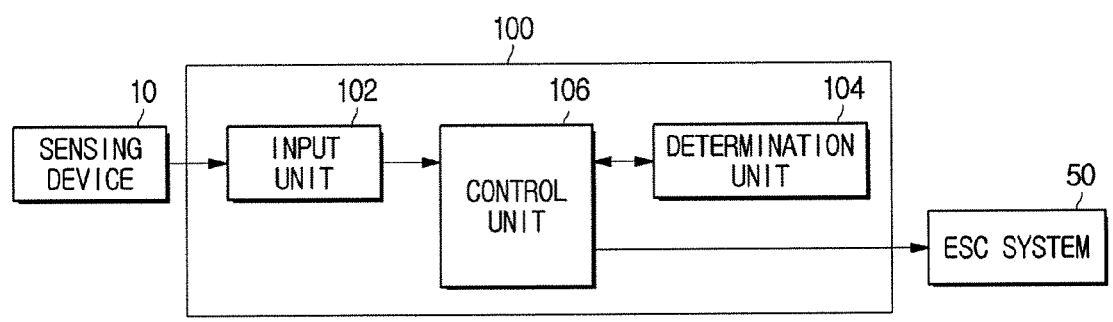
FIG. 2 is a block diagram illustrating an example of the vehicle control apparatus shown in FIG. 1.

FIG. 1 is a block diagram illustrating a state in which a vehicle control apparatus according to a first embodiment of the present invention is connected to a sensing device, an evasive handling control (EHC) system, and an electronic stability control (ESC) system, and FIG. 2 is a block diagram illustrating an example of the vehicle control apparatus shown in FIG. 1.

Figure 3:
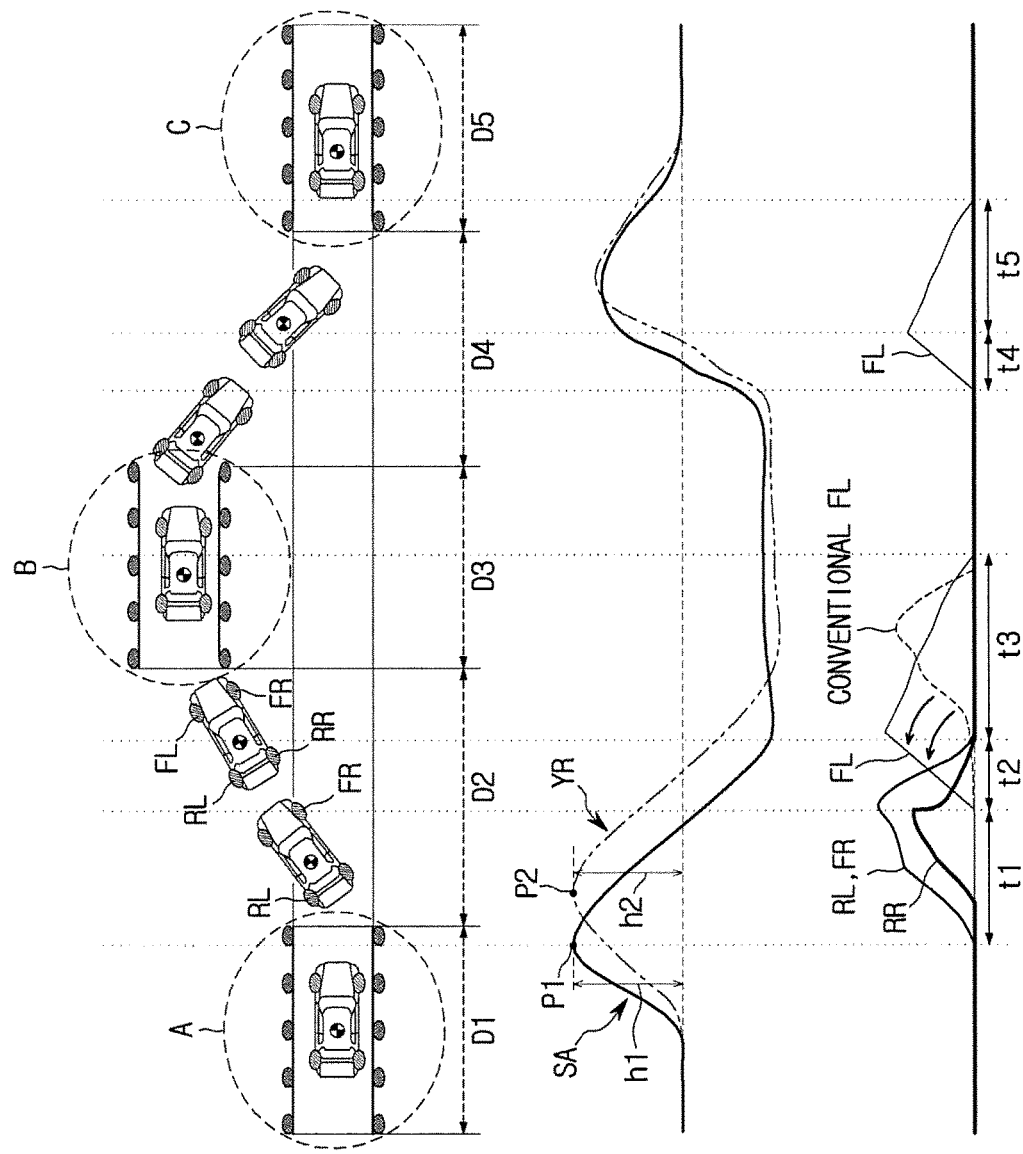
FIG. 3 is a diagram illustrating a process in which a control unit shown in FIG. 2 controls an EHC system in an emergency steering avoidance state.

FIG. 3 is a diagram illustrating a process in which a control unit shown in FIG. 2 controls an EHC system in an emergency steering avoidance state.

Figure 4:
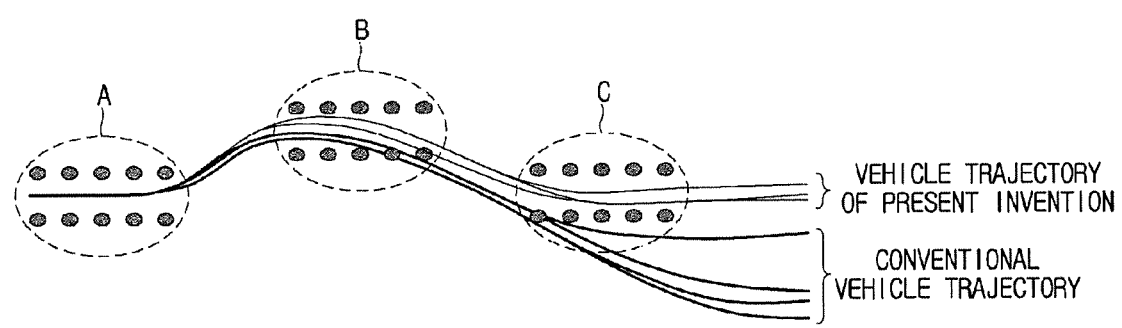
FIG. 4 is a diagram illustrating a comparison between a result obtained by measuring a vehicle trajectory passing from a point A to a point C during a distance of D1 to D5 shown in FIG. 3 and a result obtained by measuring a conventional vehicle trajectory.

FIG. 4 is a diagram illustrating a comparison between a result obtained by measuring a vehicle trajectory passing from a point A to a point C during a distance of D1 to D5 shown in FIG. 3 and a result obtained by measuring a conventional vehicle trajectory.

Referring to FIGS. 1 to 4, a vehicle control apparatus 100 according to a first embodiment of the present invention includes an input unit 102, a determination unit 104, and a control unit 106. The vehicle control apparatus 100 according to the first embodiment of the present invention further includes an EHC system 30 in a software manner.

That is, the EHC system 30 included in the vehicle control apparatus 100 in the software manner may apply pressure to a rear wheel RL located on the outer side among wheels FL FR, RL, and RR in advance ahead of the ESC system 50 to perform a braking operation according to a target wheel pressure value.

The input unit 102 receives handle operation information detected by a sensing device 10, receives avoidance steering information of a driver, and receives behavior information of a vehicle.

Here, the handle operation information may be a handle direction signal value operated by the driver, the avoidance steering information of the driver may include a steering angle change rate value, and the behavior information of the vehicle may include a lateral acceleration value and a yaw rate change rate value.

At this time, although not shown, the sensing device 10 may include sensors (not shown) for sensing the handle direction signal value, the steering angle change rate value, the lateral acceleration value, and the yaw rate change rate value.

The determination unit 104 determines whether the vehicle is in an emergency steering avoidance state based on the handle operation information, the avoidance steering information of the user, and the behavior information of the vehicle, which are input to the input unit 102, according to the control of the control unit 106 to be described later.

By way of example, as shown in FIGS. 2 and 3, when determining whether the vehicle is in the emergency steering avoidance state, the determination unit 104 may determine whether a steering angle change rate value SA of the avoidance steering information of the driver input to the input unit 102 is equal to or larger than a predetermined value h1, and whether the vehicle is in a sudden handle operation state in which the handle operation information is outside target handle operation information after exceeding a peaked point P1 of the steering angle change rate value SA, according to the control of the control unit 106.

By way of another example, as shown in FIGS. 2 and 3, when determining whether the vehicle is in the emergency steering avoidance state, the determination unit 104 may determine whether a yaw rate change rate value YR of the behavior information of the vehicle input to the input unit 102 is equal to or larger than a predetermined value h2, and whether the vehicle is in a state in which the yaw rate change rate value YR is outside a target yaw rate change rate value after exceeding a peaked point P2 of the yaw rate change rate value YR, according to the control of the control unit 106.

In addition, the determination unit 104 may further determine whether a road surface on which the vehicle is currently driving is a high-friction road surface using the lateral acceleration value of the behavior information of the vehicle input to the input unit 102. Here, when it is determined that the road surface on which the vehicle is currently driving is the high-friction road surface, the determination unit 104 may determine whether the yaw rate change rate value YR of the behavior information of the vehicle input to the input unit 102 is equal to or larger than the predetermined value h2 and whether the vehicle is in the state in which the yaw rate change rate value YR is outside the target yaw rate change rate value after exceeding the peaked point P2 of the yaw rate change rate value YR.

Next, when the determination unit 104 determines that the vehicle is in the emergency steering avoidance state, the control unit 106 controls the EHC system 30 and the ESC system 50 such that the EHC system 30 applies pressure to the wheel in advance ahead of the ESC system 50 to perform a braking operation according to the target wheel pressure value.

Here, as shown in FIGS. 2 and 3, the control unit 106 may control the EHC system 30 to apply pressure to the rear wheel RL located on the outer side among the wheels FL FR, RL, and RR in advance ahead of the ESC system 50 to perform the braking operation according to the target wheel pressure value.

At this time, as shown in FIGS. 2 and 3, the control unit 106 may control the EHC system 30 to apply pressure to the rear wheel RL in advance among the wheels FL, FR, RL, and RR, and to apply pressure to the front wheel FL in advance to perform the braking operation according to the target wheel pressure value when the pressure is applied to rear wheel RL.

By way of example, as shown in FIGS. 2 and 3, when the determination unit 104 determines that, during an interval t1, the steering angle change rate value SA of the avoidance steering information of the driver input to the input unit 102 is equal to or larger than the predetermined value hl and the vehicle is in the sudden handle operation state in which the handle operation information is outside the target handle operation information after exceeding the peaked point P1 of the steering angle change rate value SA, the control unit 106 may control the EHC system 30 and the ESC system 50 such that the EHC system 30 applies pressure to the real left wheel RL in advance ahead of the ESC system 50 during the interval t1.

Here, for the purpose of efficiently performing the braking operation during the interval t1, the control unit 106 may control the EHC system 30 to apply pressure to the front right wheel FR connected to the rear left wheel RL via a hydraulic circuit, and may control the EHC system 30 to gradually apply pressure to even the rear right wheel RR.

Next, as shown in FIGS. 2 and 3, when the determination unit 104 determines that, during an interval t2, the road surface on which the vehicle is currently driving is the high-friction road surface, the yaw rate change rate value YR of the behavior information of the vehicle input to the input unit 102 is equal to or larger than the predetermined value h2, and the vehicle is in the state in which the yaw rate change rate value YR is outside the target yaw rate change rate value after exceeding the peaked point P2 of the yaw rate change rate value YR, the control unit 106 may control the EHC system 30 and the ESC system 50 such that the EHC system 30 may apply pressure to the front left wheel FL in advance ahead of the ESC system 50 during the interval t2.

Here, for the purpose of efficiently performing the braking operation during the interval t2, the control unit 106 may control the EHC system 30 to gradually depress the front right wheel FR connected to the rear left wheel RL via a hydraulic circuit, and may control the EHC system 30 to gradually depress even the rear right wheel RR connected to the front left wheel FL via a hydraulic circuit.

At this time, for the purpose of efficiently performing the braking operation during an interval t3, the control unit 106 may control the EHC system 30 to gradually depress the front left wheel FL.

Next, as shown in FIGS. 2 and 3, when the determination unit 104 determines that, during an interval t4, the steering angle change rate value SA of the avoidance steering information of the driver input to the input unit 102 and the yaw rate change rate value YR of the behavior information of the vehicle input to the input unit 102 are not equal to or larger than the predetermined values h1 and h2, respectively, the vehicle is not in the sudden handle operation state without exceeding the peaked point P1 of the steering angle change rate value SA, and the vehicle is in a state in which the yaw rate change rate value YR is not outside the target yaw rate change rate value without exceeding the peaked point P2 of the yaw rate change rate value YR, the control unit 106 may control the EHC system 30 and the ESC system 50 such that the EHC system 30 may apply pressure to the front left wheel FL in advance ahead of the ESC system 50 during the interval t4, for the purpose of efficiently entering an original driving road surface.

At this time, for the purpose of efficiently entering the original driving road surface during an interval t5, the control unit 106 may control the EHC system 30 to gradually depress the front left wheel FL.

In this regard, as shown in FIGS. 3 and 4, according to a method for controlling the EHC system 30 using the vehicle control apparatus 100 according to an embodiment of the present invention, it may be confirmed that the vehicle stably passes from the point A to the point C to improve acceleration performance and braking performance while considering the stability at the time of traveling of the vehicle, based on a result obtained by measuring a vehicle trajectory passing from a point A to a point C during a distance of D1 to D5.

That is, as shown in FIGS. 3 and 4, according to a conventional method for controlling the EHC system 30 by applying pressure to the front left wheel FL, it may be confirmed that there is a limit that the vehicle stably passes from the point A to the point C so that there is a limit to improve the acceleration performance and the braking performance while the stability at the time of traveling of the vehicle is considered compared to the method for controlling the EHC system 30 according to the present invention, based on the result obtained by measuring the vehicle trajectory passing from the point A to the point C during the distance of Dl to D5.

At this time, although not shown, the input unit 102, the determination unit 104, and the control unit 106 may be provided to a general electronic control unit (ECU, not shown) for controlling, determining, and inputting the overall operation of a corresponding vehicle as a main computer applied to the vehicle.

In addition, although not shown, the input unit 102, the determination unit 104, and the control unit 106 may be provided to a general micro control unit (MCU, not shown) that is equipped with a processor, a memory, and an input/output device in a single chip to control, determine, and input the overall operation of a corresponding vehicle.

In addition, the input unit 102, the determination unit 104, and the control unit 106 are not limited thereto, and any control means, determination means, and input means capable of controlling, determining, and inputting the overall operation of a corresponding vehicle may be used.

Here, the input unit 102, the determination unit 104, and the control unit 106 may be integrally or separately provided to the ECU (not shown) or the MCU (not shown).

In this regard, a method for controlling a vehicle using the vehicle control apparatus 100 according to a first embodiment of the present invention will be described with reference to the flowchart shown in FIG. 5.

Figure 5:
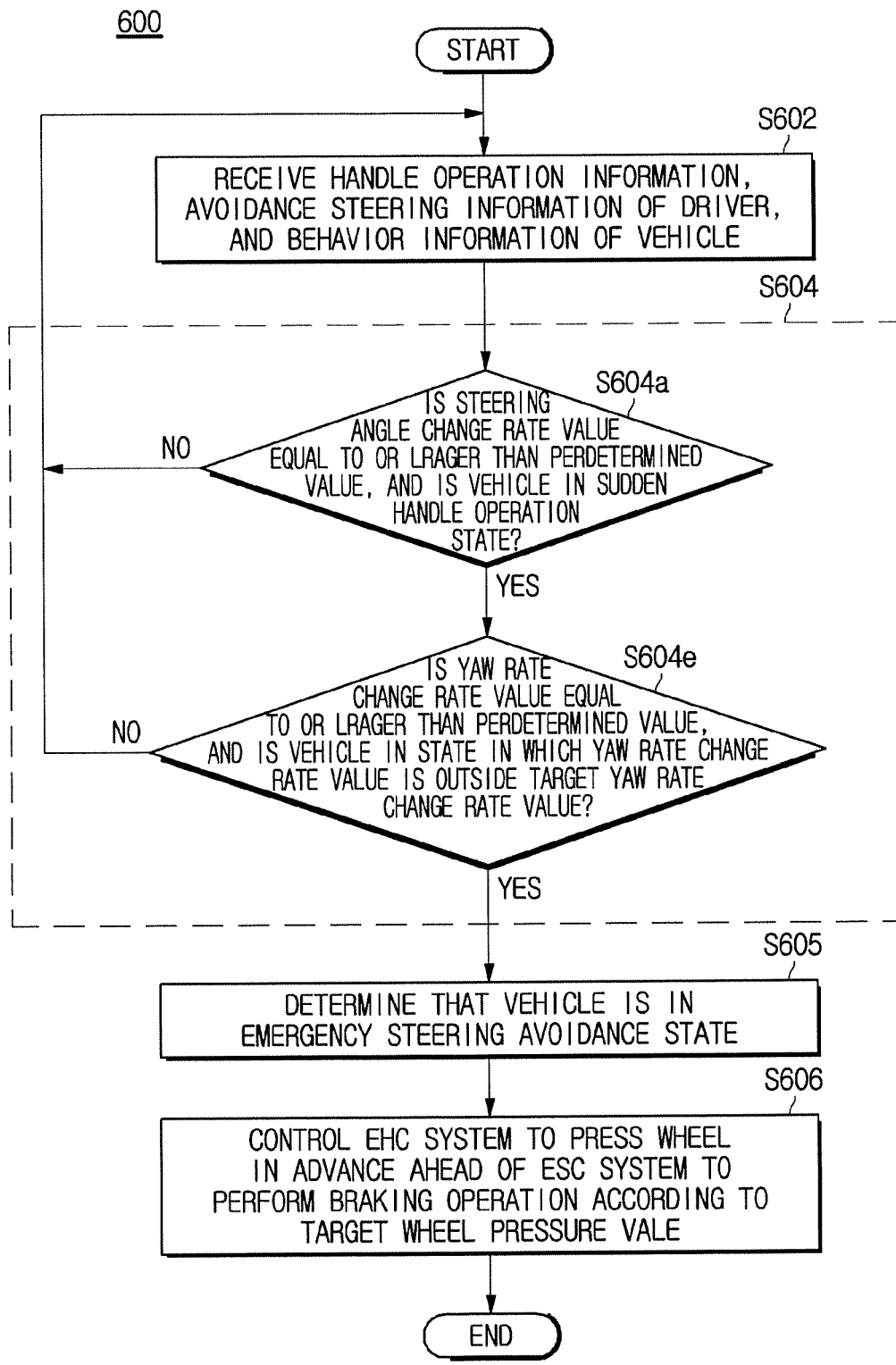
FIG. 5 is a flowchart illustrating an example of a method for controlling a vehicle using a vehicle control apparatus according to a first embodiment of the present invention.

FIG. 5 is a flowchart illustrating an example of a method for controlling a vehicle using a vehicle control apparatus according to a first embodiment of the present invention. Referring to FIG. 5, a method 600 for controlling a vehicle using the vehicle control apparatus 100 of FIG. 2 according to the first embodiment of the present invention includes inputting operation S602, determining operation S604, and controlling operation S606.

First, in inputting operation S602, the input unit 102 of FIG. 2 receives handle operation information detected by the sensing device 10 of FIG. 2, receives avoidance steering information of a driver, and receives behavior information of a vehicle.

Next, in determining operation S604, the determination unit 104 of FIG. 2 determines whether the vehicle is in an emergency steering avoidance state based on the handle operation information, the avoidance steering information of the driver, and the behavior information of the vehicle, which are input to the input unit 102 of FIG. 2, according to the control of the control unit 106 of FIG. 2.

By way of example, determining operation S604 indicated by a dotted line may include first determining operation S604a.

In first determining operation S604a, when determining whether the vehicle is in the emergency steering avoidance state, the determination unit 104 of FIG. 2 may determine whether a steering angle change rate value SA of FIG. 3 of the avoidance steering information of the driver input to the input unit 102 of FIG. 2 is equal to or larger than a predetermined value h1 of FIG. 3, and whether the vehicle is in a sudden handle operation state in which the handle operation information is outside target handle operation information after exceeding a peaked point P1 of FIG. 3 of the steering angle change rate value SA of FIG. 3, according to the control of the control unit 106 of FIG. 2.

By way of another example, determining operation S604 may include second determining operation S604e.

Second determining operation S604e may be performed after first determining operation S604a.

In second determining operation S604e, the determination unit 104 of FIG. 2 may determine whether a yaw rate change rate value YR of FIG. 3 of the behavior information of the vehicle input to the input unit 102 of FIG. 2 is equal to or larger than a predetermined value h2 of FIG. 3, and whether the vehicle is in a state in which the yaw rate change rate value YR of FIG. 3 is outside a target yaw rate change rate value after exceeding a peaked point P2 of FIG. 3 of the yaw rate change rate value YR of FIG. 3, according to the control of the control unit 106.

Next, in operation S605, the determination unit 104 of FIG. 2 may finally determine that the vehicle is in the emergency steering avoidance state in operation S605.

However, although determining operation S604 is not shown, whether a road surface on which the vehicle is currently driving is a high-friction road surface may be further determined. Specifically, before second determining operation S604e, whether the road surface on which the vehicle is currently driving is the high-friction road surface may be further determined. Here, only when the road surface on which the vehicle is currently driving is the high-friction road surface, second determining operation S604e of determining whether the yaw rate change rate value is equal to or larger than the predetermined value and whether the vehicle is in the state in which the yaw rate change rate value is outside the target yaw rate change rate value may be performed.

That is, when determining whether the vehicle is in the emergency steering avoidance state, the determination unit 104 of FIG. 2 may determine whether the road surface on which the vehicle is currently driving is the high-friction road surface using a lateral acceleration value of the behavior information of the vehicle input to the input unit 102 of FIG. 2, according to the control of the control unit 106 of FIG. 2.

That is, when the determination unit 104 of FIG. 2 determines that the lateral acceleration value input to the input unit 102 of FIG. 2 is a target lateral acceleration value set in the determination unit 104 of FIG. 2, the determination unit 104 of FIG. 2 may determine that the road surface on which the vehicle is currently driving is the high-friction road surface, according to the control of the control unit 106 of FIG. 2.

Accordingly, when it is finally determined that the vehicle is in the emergency steering avoidance state in operation S605, the control unit 106 of FIG. 2 controls the EHC system 30 of FIG. 2 and the ESC system 50 of FIG. 2 such that the EHC system 30 of FIG. 2 applies pressure to the wheel of the vehicle in advance ahead of the ESC system 50 of FIG. 2 according to a target wheel pressure value.

Here, in controlling operation S606, the control unit 106 of FIG. 2 may control the EHC system 30 of FIG. 2 to apply pressure to the rear left wheel RL of FIG. 3 located on the outer side among the wheels FL, FR, RL, and RR of FIG. 3 in advance ahead of the ESC system 50 of FIG. 2 according to the target wheel pressure value.

At this time, in controlling operation S606, the control unit 106 of FIG. 2 may control the EHC system 30 of FIG. 2 to apply pressure to the rear left wheel RL of FIG. 3 among the wheels FL, FR, RL, and RR of FIG. 3 in advance, and then to apply pressure to the front left wheel FL of FIG. 3 to perform a braking operation according to the target wheel pressure value when the pressure is applied to the rear left wheel RL of FIG. 3.

In this regard, the vehicle control apparatus 100 according to the first embodiment of the present invention and the method 600 for controlling the vehicle using the vehicle control apparatus 100 may include the input unit 102, the determination unit 104, and the control unit 106, and perform inputting operation S602, determining operation S604, and controlling operation S606.

Accordingly, the vehicle control apparatus 100 according to the first embodiment of the present invention and the method 600 for controlling the vehicle using the vehicle control apparatus 100 may apply pressure to the rear right wheel RL in advance among the wheels FL, FR, RL, and RR when the vehicle is in the emergency steering avoidance state, and then may control the EHC system 30 to apply pressure to the front left wheel FL in advance to perform a braking operation according to the target wheel pressure value when the pressure is applied to the rear left wheel RL.

Therefore, the vehicle control apparatus 100 according to the first embodiment of the present invention and the method 600 for controlling the vehicle using the vehicle control apparatus 100 may improve the acceleration performance and the braking performance while considering the stability at the time of traveling of the vehicle, when the vehicle is in the emergency steering avoidance state.

Figure 6:
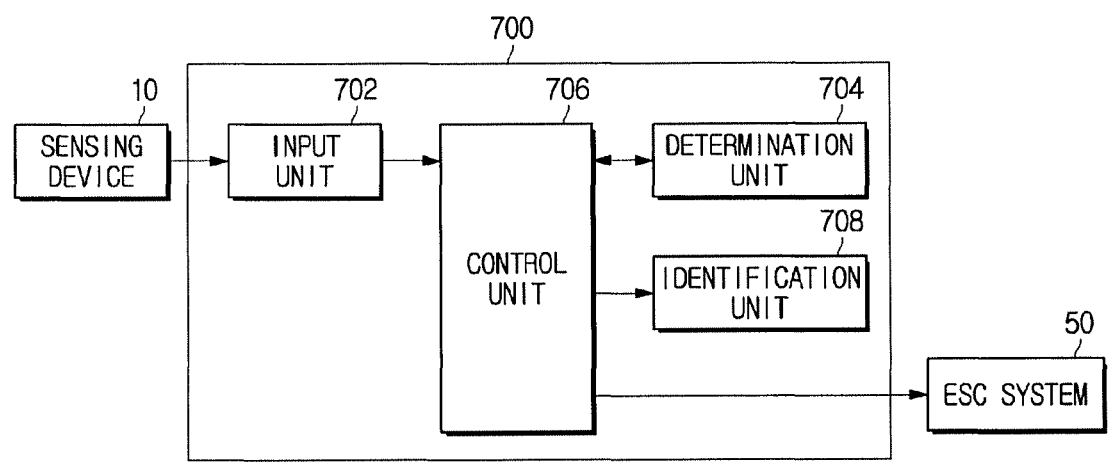
FIG. 6 is a block diagram illustrating an example of a vehicle control apparatus according to a second embodiment of the present invention.

FIG. 6 is a block diagram illustrating an example of a vehicle control apparatus according to a second embodiment of the present invention.

Referring to FIG. 6, a vehicle control apparatus 700 according to the second embodiment of the present invention includes an input unit 702, a determination unit 704, and a control unit 706 in the same manner as in the vehicle control apparatus 100 of FIG. 2 according to the first embodiment of the present invention.

In this regard, functions of the input unit 702, the determination unit 704, and the control unit 706 of the vehicle control apparatus 700 according to the second embodiment of the present invention and an organic connection relationship therebetween are the same as functions of the input unit 102 of FIG. 2, the determination unit 104 of FIG. 2, and the control unit 106 of FIG. 2 of the vehicle control apparatus 100 of FIG. 2 according to the first embodiment of the present invention and an organic connection relationship therebetween, and thus additional description thereof will be omitted.

Here, the vehicle control apparatus 700 according to the second embodiment of the present invention may further include an identification unit 708.

That is, when the determination unit 704 determines that the vehicle is in the emergency steering avoidance state, the identification unit 708 may identify that the EI-IC system 30 applies pressure to the wheel in advance to perform a braking operation according to a target wheel pressure value, according to the control of the control unit 706.

In addition, when the EHC system 30 completely performs the braking operation according to the target wheel pressure value, the identification unit 708 may identify that the braking operation is completely performed according to the target wheel pressure value, according to the control of the control unit 706.

At this time, although not shown, the identification unit 708 may include at least one of an alarm (not shown) provided for a driver to identify information or a status of the vehicle, a speaker (not shown), and a light emitting member (not shown). Here, the identification unit 708 may identify that the EHC system 30 applies pressure to the wheel in advance to perform the braking operation according to the target wheel pressure value through at least one of an alarming operation of the alarm (not shown), a sound operation of the speaker (not shown), and alight emitting operation of the light emitting member (not shown), and may identify that the braking operation is completely performed according to the target wheel pressure value.

In addition, although not shown, the identification unit 708 may include at least one of a human machine interface (HMI) module (not shown) and a head-up display (HUD) module (not shown) which are mounted to interface a user and a machine so that the driver can determine the information or the status of the vehicle. Here, the identification unit 708 may identify that the EHC system 30 applies pressure to the wheel in advance to perform the braking operation according to the target wheel pressure value through at least one of an HMI message display operation of the HMI module (not shown) and an HUD message display operation of the HUD module (not shown), and may identify that the braking operation is completely performed according to the target wheel pressure value.

In this regard, the method for controlling the vehicle using the vehicle control apparatus 700 according to the second embodiment of the present invention will be described with reference to FIG. 7.

Figure 7:
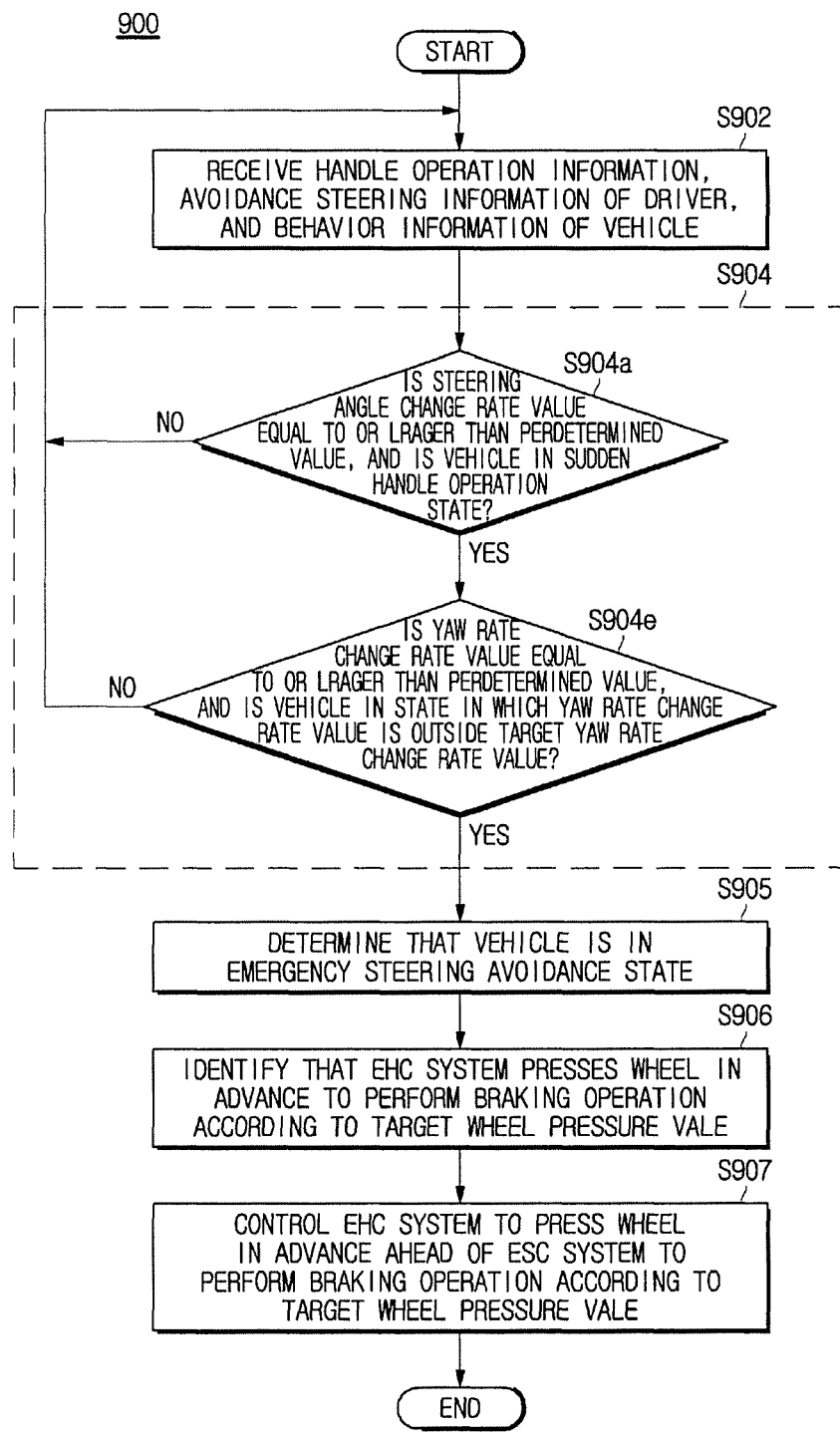
FIG. 7 is a flowchart illustrating an example of a method for controlling a vehicle using a vehicle control apparatus according to a second embodiment of the present invention.

FIG. 7 is a flowchart illustrating an example of a method for controlling a vehicle using a vehicle control apparatus according to a second embodiment of the present invention.

Referring to FIG. 7, a method 900 for controlling a vehicle using the vehicle control apparatus 700 of FIG. 6 according to the second embodiment of the present invention includes inputting operation S902, determining operation S904, and controlling operation S907 in the same manner as in the method for controlling the vehicle using the vehicle control apparatus 100 of FIG. 2 according to the first embodiment of the present invention.

In this regard, functions of respective operations of the method 900 for controlling the vehicle using the vehicle control apparatus 700 of FIG. 6 according to the second embodiment of the present invention and an organic connection relationship of the respective operations are the same as functions of the respective operations of the method for controlling the vehicle using the vehicle control apparatus 100 of FIG. 2 according to the first embodiment of the present invention and an organic connection relationship of the respective operations, and thus additional description thereof will be omitted.

Here, the method for controlling the vehicle using the vehicle control apparatus 700 of FIG. 6 according to the second embodiment of the present invention may further include first identifying operation S906. First identifying operation S906 may be performed after determining operation S904 and before controlling operation S907. That is, after determining operation S904, when the vehicle is in an emergency steering avoidance state in operation S905, first identifying operation S906 may be performed.

By way of another example, although not shown, first identifying operation S906 may be synchronized with controlling operation S907 and then performed.

In this regard, in first identifying operation S906, when the determination unit 704 of FIG. 7 determines that the vehicle is in the emergency steering avoidance state, the identification unit 708 of FIG. 7 may identify that an EHC system 30 of FIG. 7 applies pressure to the wheel in advance to perform a braking operation according to a target wheel pressure value, according to the control of the control unit 706 of FIG. 7.

In addition, although not shown, the method for controlling the vehicle using the vehicle control apparatus 700 of FIG. 6 according to the second embodiment of the present invention may further include second identifying operation.

Specifically, second identifying operation may be performed after controlling operation S907.

In this regard, in second identifying operation, when the EHC system 30 of FIG. 7 completely performs the braking operation according to the target wheel pressure value, the identification unit 708 of FIG. 6 may identify that the braking operation is completely performed according to the target wheel pressure value, according to the control of the control unit 706 of FIG. 6.

In this regard, the vehicle control apparatus 700 according to the second embodiment of the present invention and the method for controlling the vehicle using the vehicle control apparatus 700 may include the input unit 702, the determination unit 704, the control unit 706, and the identification unit 708, and may perform inputting operation S902, determining operation S904, first identifying operation S906, controlling operation S907, and second identifying operation.

Accordingly, the vehicle control apparatus 700 according to the second embodiment of the present invention and the method for controlling the vehicle using the vehicle control apparatus 700 may control the EHC system 30 to apply pressure to the rear left wheel RL in advance among the wheels FL, FR, RL, and RR when the vehicle is in the emergency steering avoidance state, and then to apply pressure to the front left wheel FL in advance to perform the braking operation according to the target wheel pressure value when pressure is applied to the rear left wheel RL.

Therefore, the vehicle control apparatus 700 according to the second embodiment of the present invention and the method for controlling the vehicle using the vehicle control apparatus 700 may improve the acceleration performance and the braking performance while considering the stability at the time of traveling of the vehicle, when the vehicle is in the emergency steering avoidance state.

In addition, the vehicle control apparatus 700 according to the second embodiment of the present invention and the method for controlling the vehicle using the vehicle control apparatus 700 may identify that the EHC system 30 applies pressure to the wheel in advance to perform the braking operation according to the target wheel pressure value, and identify that the braking operation is completely performed according to the target wheel pressure value.

Accordingly, the vehicle control apparatus 700 according to the second embodiment of the present invention and the method for controlling the vehicle using the vehicle control apparatus 700 may allow a driver to recognize a current braking state according to a current wheel pressure, so that it is possible to restrain the driver's anxiety about the current braking state according to the current wheel pressure while inducing the driver to perform a careful driving.

As described above, the vehicle control apparatus according to the present invention and the method for controlling the vehicle using the same may improve the acceleration performance and the braking performance while considering the stability at the time of traveling of the vehicle.

In addition, the vehicle control apparatus according to the present invention and the method for controlling the vehicle using the same may restrain a driver's anxiety about a current braking state according to a current wheel pressure while inducing the driver to perform a careful driving.

What is claimed is:

1. A vehicle control apparatus comprising:
a plurality of sensors configured to provide handle operation information, avoidance steering information of a driver, and behavior information of a vehicle; and
a processor configured to:
determine whether the vehicle is in an emergency steering avoidance state based on the handle operation information, a steering angle change rate value obtained from the avoidance steering information of the driver, and the behavior information of the vehicle received from the plurality of sensors; and
control an evasive handling control (EHC) system and an electronic stability control (ESC) system such that the EHC system applies pressure to wheels in advance ahead of the ESC system to perform a braking operation according to a target wheel pressure value, when the vehicle is in the emergency steering avoidance state,
wherein, when determining whether the vehicle is in the emergency steering avoidance state, the processor determines whether the steering angle change rate value of the avoidance steering information of the driver is equal to or larger than a predetermined value, and whether the vehicle is in a sudden handle operation state in which the handle operation information is outside target handle operation information after exceeding a peaked point of the steering angle change rate value.

2. The vehicle control apparatus according to claim 1, wherein the processor controls the EHC system to apply the pressure to a rear wheel among the wheels in advance to perform the braking operation according to the target wheel pressure value.

3. The vehicle control apparatus according to claim 1, wherein the processor controls the EHC system to apply the pressure to rear wheels of the wheels in advance, and to apply the pressure to front wheels thereof in advance to perform the braking operation according to the target wheel pressure value when the pressure is applied to the rear wheels.

4. The vehicle control apparatus according to claim 1, wherein the processor is further configured to issue an alert identifying when the EHC system applies the pressure to the wheels in advance to perform the braking operation according to the target wheel pressure value, when the vehicle is in the emergency steering avoidance state.

5. The vehicle control apparatus according to claim 1, wherein the processor is further configured to issue an alert identifying when the braking operation is completely performed according to the target wheel pressure value, when the EHC system completely performs the braking operation according to the target wheel pressure value.

6. The vehicle control apparatus according to claim 2, wherein the processor controls the EHC system to apply the pressure to rear wheels of the wheels in advance, and to apply the pressure to front wheels thereof in advance to perform the braking operation according to the target wheel pressure value when the pressure is applied to the rear wheels.

7. A vehicle control apparatus comprising:
a plurality of sensors configured to provide handle operation information, avoidance steering information of a driver, and behavior information of a vehicle; and
a processor configured to:
determine whether the vehicle is in an emergency steering avoidance state based on the handle operation information, a steering angle change rate value obtained from the avoidance steering information of the driver, and the behavior information of the vehicle received from the plurality of sensors; and
control an evasive handling control (EHC) system and an electronic stability control (ESC) system such that the EHC system applies pressure to wheels in advance ahead of the ESC system to perform a braking operation according to a target wheel pressure value, when the vehicle is in the emergency steering avoidance state,
wherein, when determining whether the vehicle is in the emergency steering avoidance state, the processor determines whether a road surface on which the vehicle is currently driving is a high-friction road surface using a lateral acceleration value of the behavior information of the vehicle, whether a yaw rate change rate value of the behavior information of the vehicle is equal to or larger than a predetermined value when the road surface on which the vehicle is currently driving is the high-friction road surface, and whether the vehicle is in a state in which the yaw rate change rate value is outside a target yaw rate change rate value after exceeding a peaked point of the yaw rate change rate value.

8. A method for controlling a vehicle comprising:
receiving handle operation information detected by one or more sensors, receiving avoidance steering information of a driver, and receiving behavior information of a vehicle;
determining whether the vehicle is in an emergency steering avoidance state based on the received handle operation information, a steering angle change rate value obtained from the received avoidance steering information of the driver, and the received behavior information of the vehicle; and
controlling an EHC system and an ESC system such that the EHC system applies a pressure to wheels in advance ahead of the ESC system to perform a braking operation according to a target wheel pressure value, when the vehicle is in the emergency steering avoidance state,
wherein the determining whether the vehicle is in the emergency steering avoidance state comprises determining whether the steering angle change rate value of the avoidance steering information of the driver is equal to or larger than a predetermined value, and whether the vehicle is in a sudden handle operation state in which the handle operation information is outside target handle operation information after exceeding a peaked point of the steering angle change rate value.

9. A vehicle control apparatus comprising:
a plurality of sensors configured to provide handle operation information, avoidance steering information of a driver, and behavior information of a vehicle; and
a processor configured to:
determine whether the vehicle is in an emergency steering avoidance state based on the handle operation information, the avoidance steering information of the driver, and a yaw rate change rate value obtained from the behavior information of the vehicle received from the plurality of sensors; and
control an evasive handling control (EHC) system and an electronic stability control (ESC) system such that the EHC system applies a pressure to wheels in advance ahead of the ESC system to perform a braking operation according to a target wheel pressure value, when the vehicle is in the emergency steering avoidance state,
wherein, when determining whether the vehicle is in the emergency steering avoidance state, the processor determines whether a road surface on which the vehicle is currently driving is a high-friction road surface using a lateral acceleration value of the behavior information of the vehicle, whether the yaw rate change rate value of the behavior information of the vehicle is equal to or larger than a predetermined value when the road surface on which the vehicle is currently driving is the high-friction road surface, and whether the vehicle is in a state in which the yaw rate change rate value is outside a target yaw rate change rate value after exceeding a peaked point of the yaw rate change rate value.

10. The vehicle control apparatus according to claim 9, wherein the processor controls the EHC system to apply the pressure to a rear wheel among the wheels in advance to perform the braking operation according to the target wheel pressure value.

11. The vehicle control apparatus according to claim 9, wherein the processor controls the EHC system to apply the pressure to the rear wheels of the wheels in advance, and to apply the pressure to the front wheels thereof in advance to perform the braking operation according to the target wheel pressure value when the pressure is applied to the rear wheels.

12. The vehicle control apparatus according to claim 9, wherein the processor is further configured to issue an alert identifying when the EHC system applies the pressure to the wheels in advance to perform the braking operation according to the target wheel pressure value, when the vehicle is in the emergency steering avoidance state.

13. The vehicle control apparatus according to claim 9, wherein the processor is further configured to issue an alert identifying when the braking operation is completely performed according to the target wheel pressure value, when the EHC system completely performs the braking operation according to the target wheel pressure value.

14. The vehicle control apparatus according to claim 10, wherein the processor controls the EHC system to apply the pressure to the rear wheels of the wheels in advance, and to apply the pressure to the front wheels thereof in advance to perform the braking operation according to the target wheel pressure value when the pressure is applied to the rear wheels.

15. A vehicle control apparatus comprising:
a plurality of sensors configured to provide handle operation information, avoidance steering information of a driver, and behavior information of a vehicle; and
a processor configured to:
determine whether the vehicle is in an emergency steering avoidance state based on the handle operation information, the avoidance steering information of the driver, and a yaw rate change rate value obtained from the behavior information of the vehicle received from the plurality of sensors; and
control an evasive handling control (EHC) system and an electronic stability control (ESC) system such that the EHC system applies a pressure to wheels in advance ahead of the ESC system to perform a braking operation according to a target wheel pressure value, when the vehicle is in the emergency steering avoidance state,
wherein, when determining whether the vehicle is in the emergency steering avoidance state, the processor determines whether a steering angle change rate value of the avoidance steering information of the driver is equal to or larger than a predetermined value, and whether the vehicle is in a sudden handle operation state in which the handle operation information is outside target handle operation information after exceeding a peaked point of the steering angle change rate value.

* * * * *